United States Patent
Yamada

Patent Number: 6,166,751
Date of Patent: *Dec. 26, 2000

[54] IMAGE FORMING APPARATUS

[75] Inventor: Hirokazu Yamada, Kobe, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/692,525

[22] Filed: Aug. 5, 1996

[30] Foreign Application Priority Data

Aug. 31, 1995 [JP] Japan ................. H7-223160

[51] Int. Cl.[7] .......................... B41J 2/435; G01D 15/14; H01J 29/70; H01J 33/00
[52] U.S. Cl. ................................................ 347/131
[58] Field of Search ...................... 347/131, 240, 347/251; 399/27; 358/298; 395/872

[56] References Cited

U.S. PATENT DOCUMENTS 4,698,691  10/1987  Suzuki et al. .
5,646,670   7/1997  Seto et al. ................. 347/131

OTHER PUBLICATIONS

Catalogue of TonerMiser, 1994.

*Primary Examiner*—John Barlow
*Assistant Examiner*—Raquel Yvette Gordon
*Attorney, Agent, or Firm*—Burns, Doane, Swecker & Mathis, LLP

[57] ABSTRACT

An image forming apparatus with toner saving mode is disclosed. This image forming apparatus comprising a normal ditheringing matrix and a toner saving mode ditheringing matrix having threshold data higher than that of the normal ditheringing matrix. The normal ditehring matrix is for image data processing under non-toner saving mode and the toner saving mode matrix is for image data processing under toner saving mode. The selection of the dithering matrix is executed by a central processing unit in response with the existance of order for toner saving. The processed image data processed by one of the dithreing matrix maintains the expression of linear tonality.

28 Claims, 11 Drawing Sheets

FIG. 3
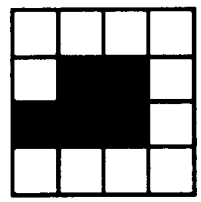 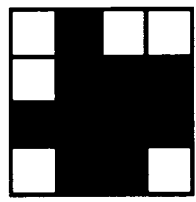
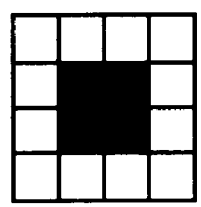 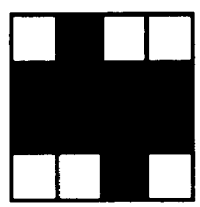 
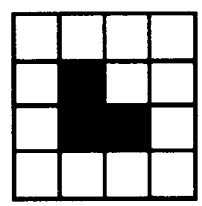 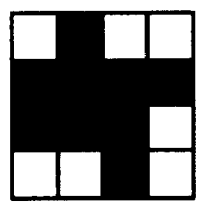 
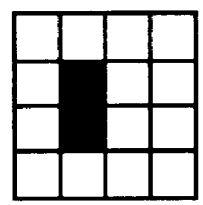 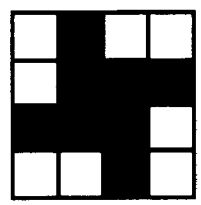 
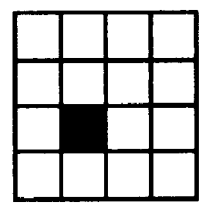 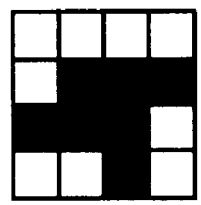 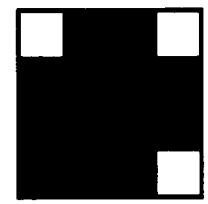
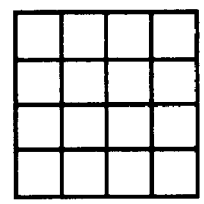 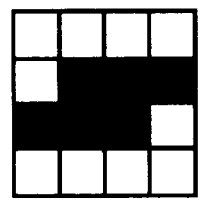 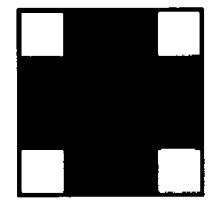

FIG. 5
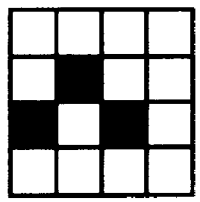 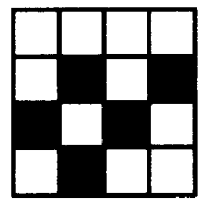
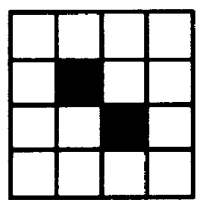 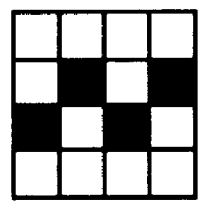 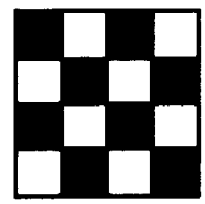
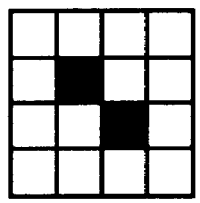 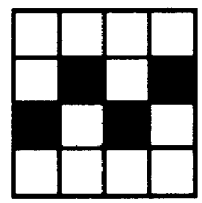 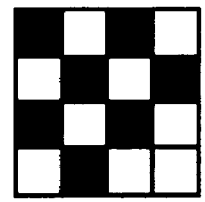
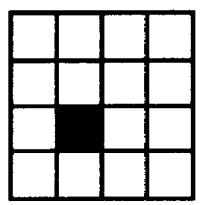 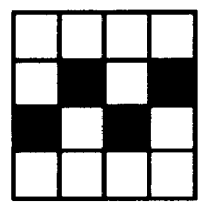 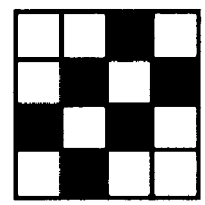
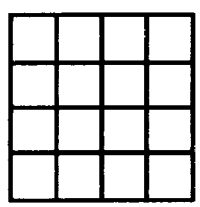 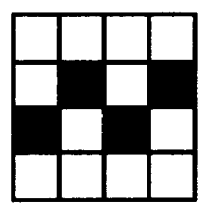 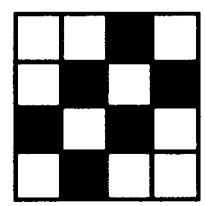
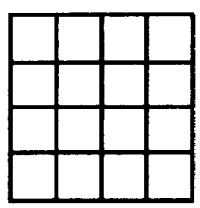 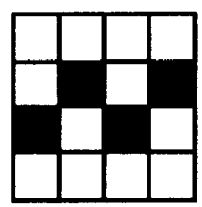 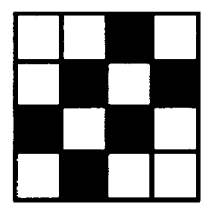

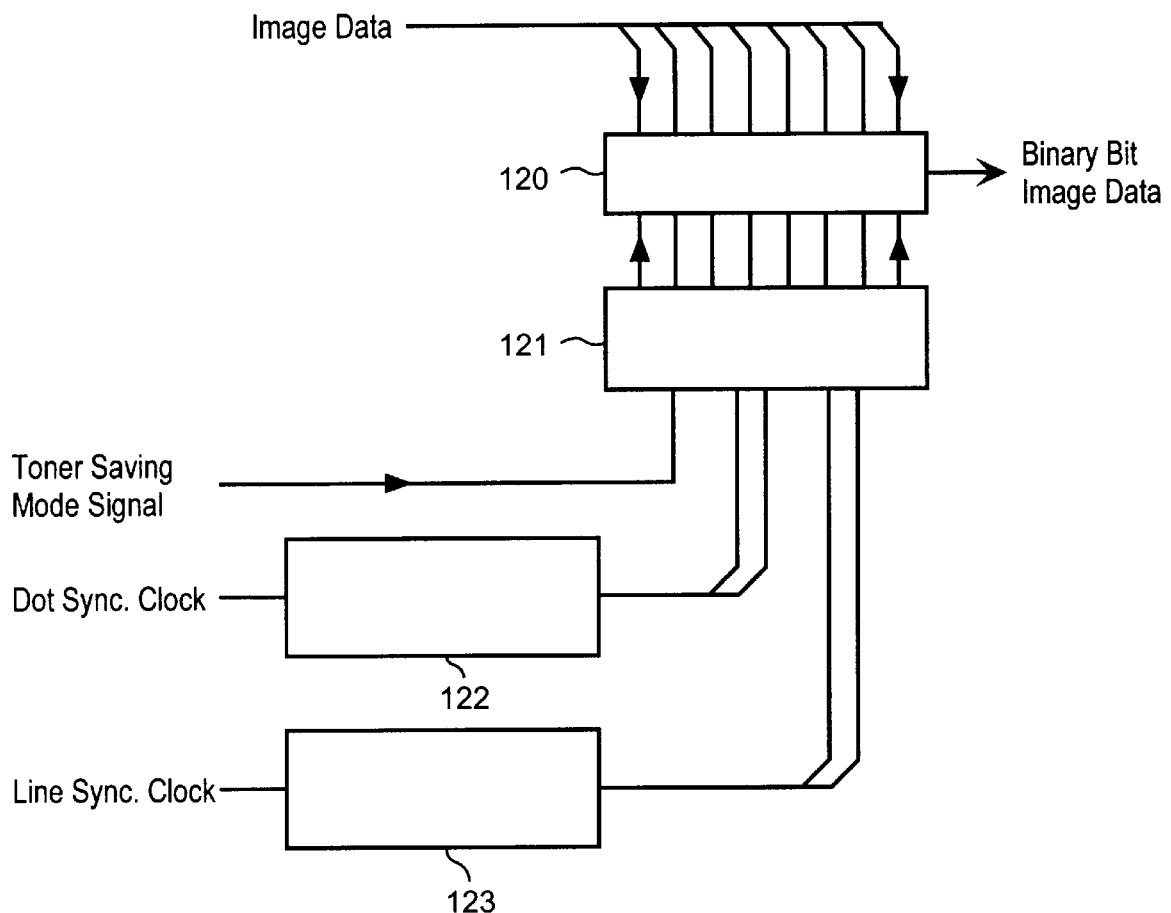

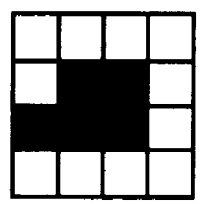
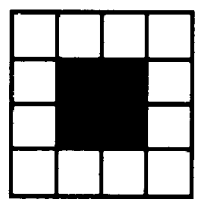
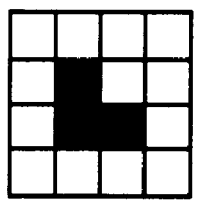
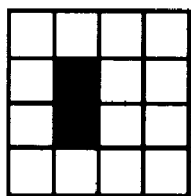
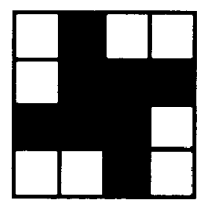
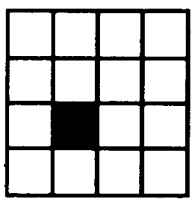
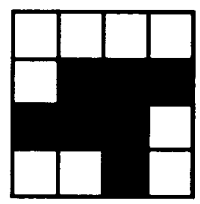
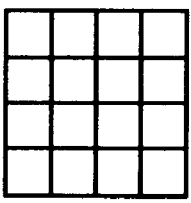
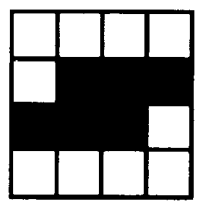
FIG. 12

IMAGE FORMING APPARATUS

BACKGROUND OF THE INVENTION

1. Field of the Invention

The present invention relates to an image forming apparatus such as a laser beam printer, an ink jet printer and the like. The present invention also relates to an image processing device installed in an image forming apparatus such as a laser beam printer, an ink jet printer and the like.

2. Description of the Related Art

Copying apparatuses and printers using electrophotographic and inkjet methods are well known as conventional apparatuses which reproduce images on papers. Such printers and copying apparatuses reproduce images by adhering, i.e., consuming, toning material such as toner, ink and the like on paper. There are various conditions relating to the black/white ratio of the image, including normal contrast images as in photographs or characters of different thickness or different numbers of characters of the same single page. Accordingly, consumption of toning material fluctuates via the black/white ratio and influences running costs even when reproducing the same single page image. Thus, relatively high contrast results, particularly when reproducing images having a high black/white ratio (mostly black), e.g., when making temporary proof prints is required. In order to reduce such needless cost as much as possible, circuits and apparatuses provided with a toner saving mode have been proposed or realized (e.g., the Laserjet 4 manufactured by Hewlett Packard co., or the EET ASIC circuit made be Destiny, Inc.).

The toner saving mode of the aforesaid conventional apparatuses or circuits reduces the consumption of toning material by approximately halving the number of dots printed by culling every other dot of image data. For example, when printing image data of the character "A" shown in FIG. 1, the print output is as shown in FIG. 2 in the circuit of the aforesaid conventional apparatuses. In this instance, an image entirely of light density is printed as a result, but such printing is efficient for proof printing and when high image quality is unnecessary (e.g., sufficient for reading text).

The aforesaid toner saving mode is an effective function for images having a high black/white ratio. The black/white ratio of a text image is less than 10 percent. In contrast, the black/white ratio of halftone images such as photographs when the entire surface is printed is greater than 30 percent, and a black/white ratio in excess of 50 percent is not exceptional. That is, the toner saving mode can be said to be most effective for halftone images.

In a conventional toner saving mode, however, toner consumption is reduced by culling of simple dot data. Therefore, when accomplishing a culling process on a halftone image expressed by the variable area tone method, the linearity of the tonal expression is lost. This phenomenon is described using FIGS. 3 through 5. The variable area tone method handles submatrices of nxn dots as single image elements, and expresses the variable density of each pixel of a halftone image by changing the percentage of the black pixels within the submatrix. In apparatuses using the variable area tone method, the variable area tone method is accomplished by well known ditheringing methods performed on image data of the halftone image which expresses the variable density of each dot by multi-level data so as to form binary bit image data. FIG. 3 shows a total of 16 ditheringing patterns when expressing the densities of 16 tones of 4×4 dot submatrices as single pixels. When these ditheringing patterns are subjected to a culling process which removes every other dot as in the previously mentioned toner saving mode, the result is as shown in FIG. 4 or FIG. 5. Although reducing the number of tones is a natural means to cull dot data within each pattern, the loss of linearity of tone expression can be understood by the changes in density of both patterns of FIGS. 4 and 5 which are nonuniform with many instances of the same consecutive density with abrupt changes to a next density.

SUMMARY OF THE INVENTION

An object of the present invention is to provide an image forming apparatus or image processing device which can eliminate the above mentioned disadvantage of the conventional apparatus or circuit.

An another object of the present invention is to provide an image forming apparatus provided with a toner saving mode or an image processing device for reducing consumption of toning material while maintaining excellent image quality.

An another object of the present invention is to provide an image forming apparatus or an image processing device which can set the toner saving mode in appropriate condition of the image forming apparatus.

Furthermore, another object of the present invention is to provide image forming apparatus or an image processing device which can automatically set the toner saving mode when the toning material contained in the image forming apparatus has been depleted.

To achieve one of the above mentioned object, the image forming apparatus or the image processing device of the present invention comprises first processing means for porcessing input image data and for outputting the processed image data, said first processing means processing the input image data so that tone of the processed image data being substantially proportional to tone of the input image data; second processing means for processing input image data and for outputting the processed image data, said second processing means processing the input image data so that tone of the processed image data being substantially proportional to tone of said input image, wherein tone of the image data processed by said second processing means is different from tone of the image data processed by said first processing means; and selecting means for selecting one of said first and second processing means based on an input signal.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 3 shows a total of 16 patterns of submatrices when a 4×4 dot submatrix is used as one pixel to express variable density of 16 tones;

FIG. 5 shows results when the data of each pattern of FIG. 3 are subjected to a culling process of each dot;

FIG. 8 shows an example of a circuit diagram of the halftone processing unit;

FIG. 9 shows a typical dithering matrix;

FIG. 10 shows a toner saving mode dithering matrix;

FIG. 12 shows dithering patterns used when the toner saving mode is set;

DETAILED DESCRIPTION OF THE PREFERRED EMBODIMENTS

A preferred embodiment of the image forming apparatus of the present invention in the form of a laser beam printer 100 is described hereinafter with reference to the accompanying drawings.

Figure 1:
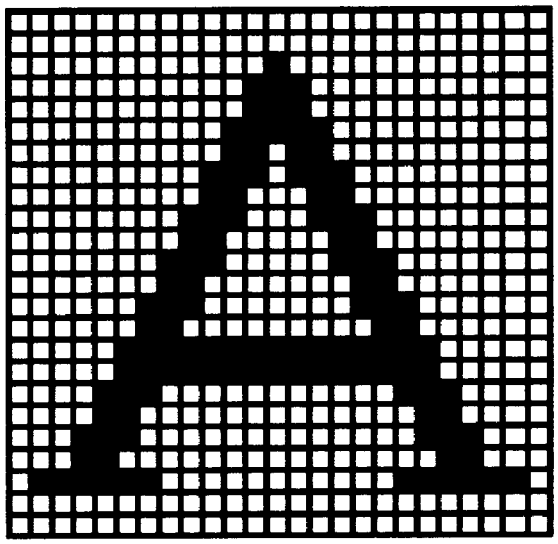
FIG. 1 shows expanded dot map data based on character image data.
Figure 2:
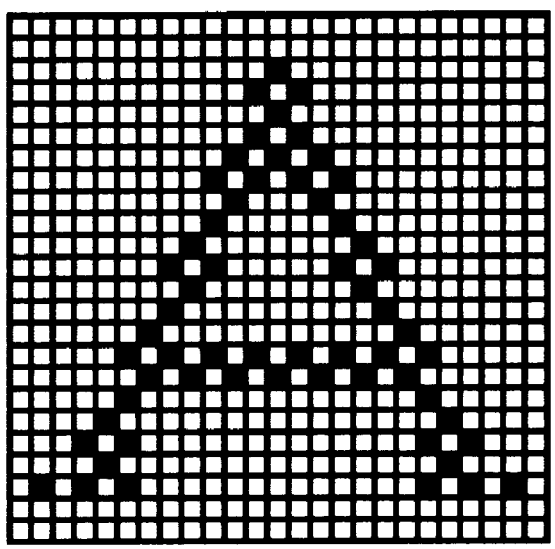
FIG. 2 shows the condition of an image formed on paper when the bitmap data of FIG. 1 are culled for each dot and output to a print engine.
Figure 4:
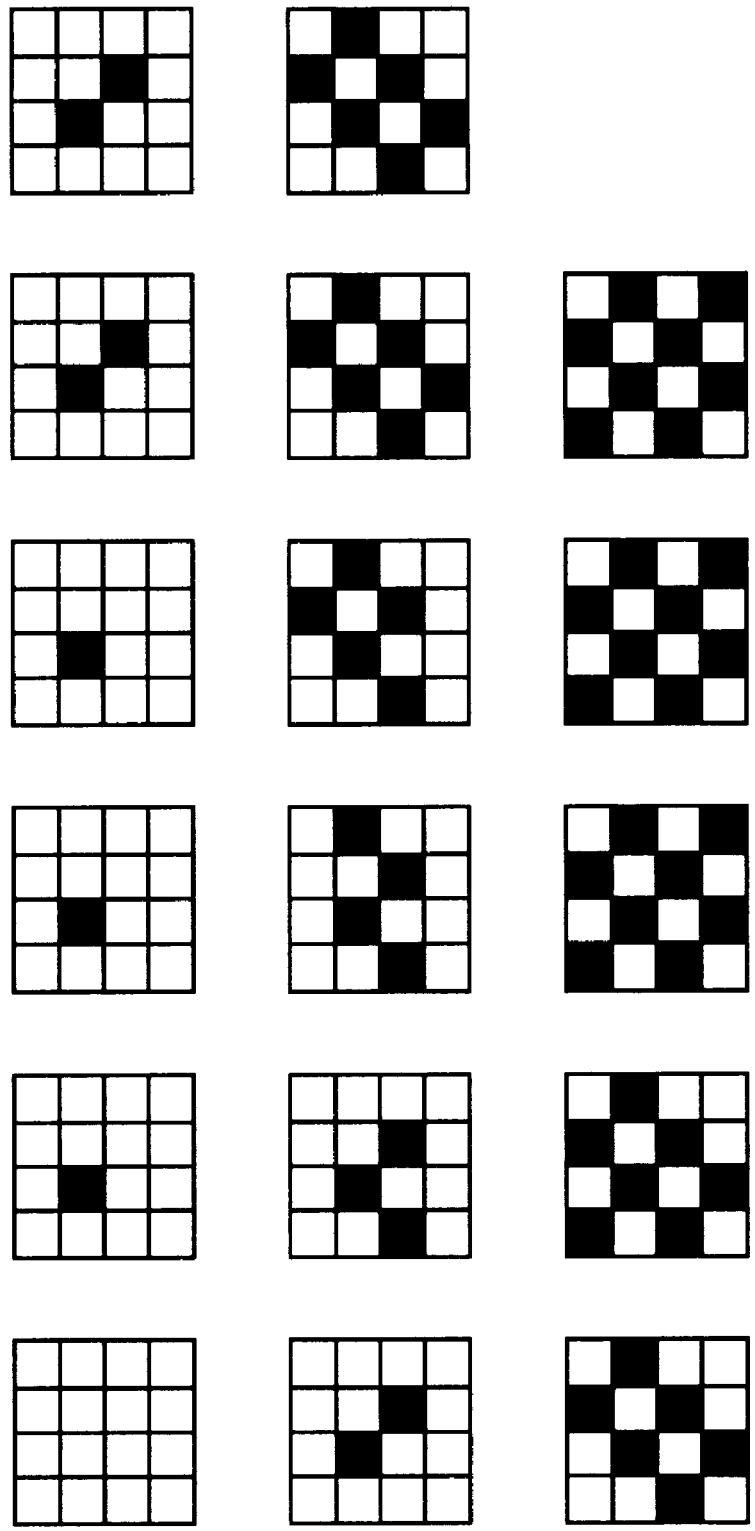
FIG. 4 shows results when the data of each pattern of FIG. 3 are subjected to a culling process of each dot.
Figure 6:
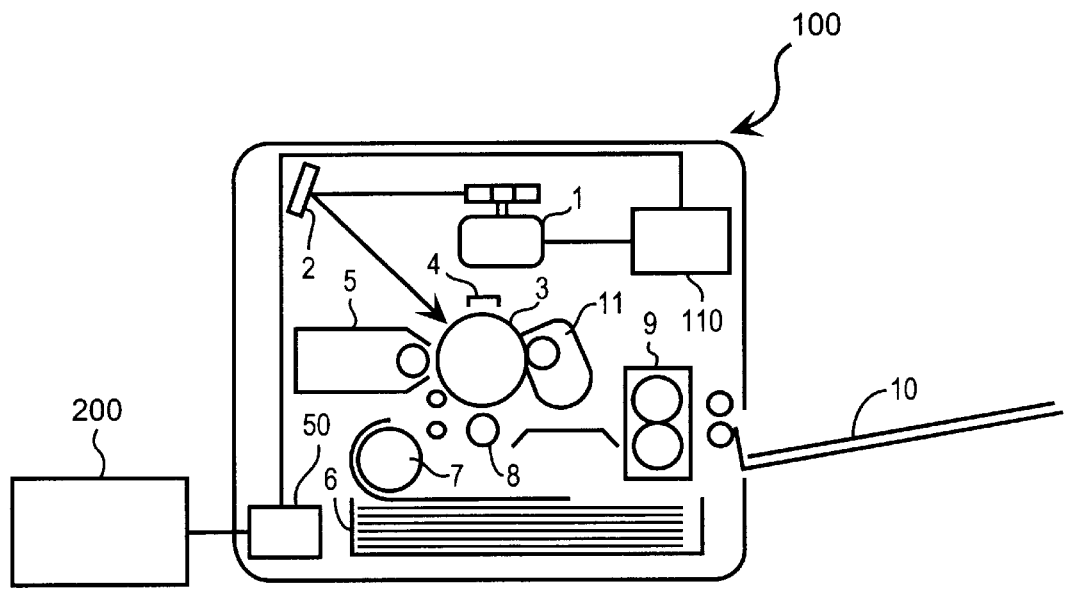
FIG. 6 is a section view of a laser beam printer using the variable area tone method.

FIG. 6 shows the construction of laser beam printer 100 using a variable area tone method. Signal processing unit 110 receives image data of 8-bits per dot from a host computer 200 via host interface 50. The signal processing unit 110 performs a variable area tone process on image data via a dithering method to produce binary bit image data. Image processing unit 110 outputs said bit image data to exposure unit 1. Exposure unit 1 generates a laser beam in accordance with input binary bit image data. The laser beam generated by exposure unit 1 irradiates the surface of a photosensitive member 3 via mirror 2, as indicated by the arrow in the drawing. When photosensitive member 3, which has been uniformly charged by a charger 4, is irradiated by the exposure light emitted from exposure unit 1, an electrostatic latent image is formed on the surface of said photosensitive member 3. Developing device 5 adheres toner, i.e., toning material, to said electrostatic latent image formed on the surface of photosensitive member 3 so as to render said latent image visible. The toner adhered to the surface of photosensitive member 3 is then transferred via a transfer charger 8 onto a transfer sheet transported from paper cassette 6 via a transport roller 7. The toner image transferred to the transfer sheet is fused thereon by a fixing device 9, and thereafter said sheet is ejected to a discharge tray 10. After the transfer operation, the residual toner and potential remaining on the surface of photosensitive member 3 are eliminated by an eraser 11. The image forming operation performed by the laser beam printer of an electrophotographic type is a well known method and is, therefore, not discussed in detail.

Figure 7:
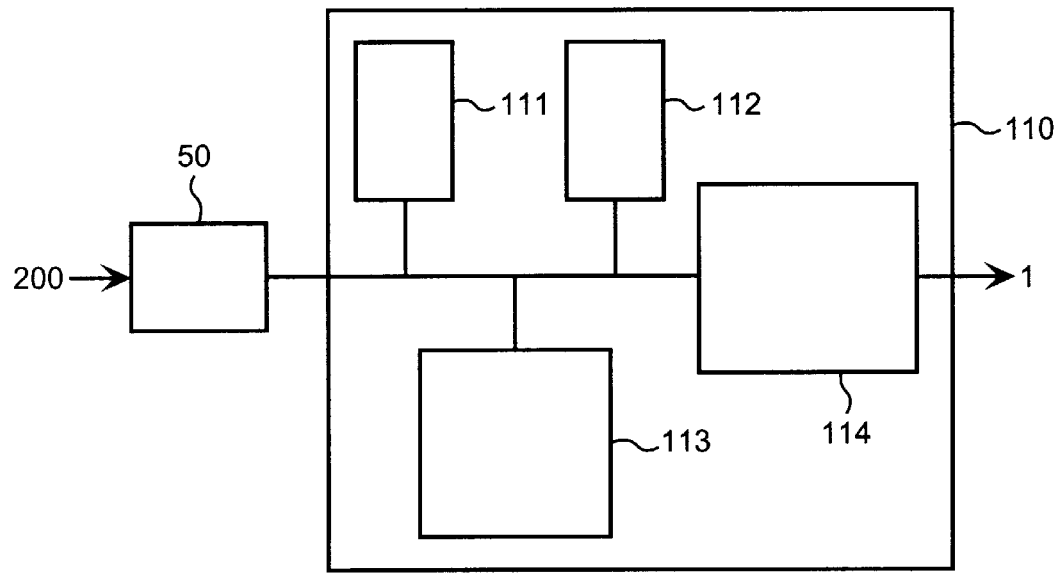
FIG. 7 is a block diagram of the signal processing unit.

FIG. 7 is a block diagram of signal processing unit 110. A central processing unit (CPU) 111 expands image data expressing 1-dot data as 8-bit data in image memory 113 based on image data received from host computer 200 via host interface 50. The CPU 111 also accomplishes general control of signal processing unit 110, and communication control of the printer engine components such as exposure unit 1, a motor (not illustrated) for driving photosensitive member 3, charger 4, developing device 5, transport roller 7, transfer charger 8, fixing device 9, and eraser 11. The programs executed by CPU 111 are stored in a read only memory (ROM) 112. An image memory 113 comprises dynamic random access memory (DRAM), and stores image data expanded by CPU 11. The image memory 113 is also used as a work area for CPU 111. Tone processing unit 114 generates binary bit images by performing variable area tone process via a dithering method on the image data expanded in image memory 113. Tone processing unit 114 receives binary toner saving mode signals from a host computer 200. When the toner saving mode is set, the value of the toner saving mode signal input from a host computer 200 is [0]. As described later, tone processing unit 114 executes a process for reducing the amount of toner consumption when the toner saving mode is set (i.e., when the toner saving mode signal value is [0]), wherein the number of tones of an image formed on a sheet is less than the number of said tones when the toner saving mode is not set (i.e., when the toner saving mode signal value is [1]).

FIG. 8 shows a first embodiment of a circuit of tone process unit 114 of FIG. 7. This circuit is provided with a toner saving mode dithering matrix in addition to a normal dithering matrix. When the toner saving mode is set, the number of tones of an image formed on a sheet is reduced using the aforesaid toner saving mode dithering matrix. The 8-bit per dot image data transmitted from image memory 113 are input to a comparator 120. The host computer 200 outputs a toner saving mode signal of [0] when the toner saving mode is set and outputs a toner saving mode signal of [1] when the toner saving mode is not set, said signals being output to a dithering table memory 121 via host interface 50. The dithering table memory 121 stores threshold values of the normal dithering matrix and of the toner saving mode dithering matrix. The dithering table memory 121 uses the normal dithering matrix (refer to FIG. 9) when the toner saving mode is not set (i.e., when the toner saving mode signal value is [1]), and uses the toner saving mode dithering matrix (refer to FIG. 10) when the toner saving mode is set (i.e., when the toner saving mode signal value is [0]). The binary bit address counters 122 for the main scan and 123 for the subscan are incremented by the dot synchronization clock and the line synchronization clock. The dithering table memory 121 outputs to comparator 120 the threshold values of specific addresses of the count values of counters 122 and 123 within the specific dithering matrix based on the value of the toner saving mode signal. The comparator 120 compares the value of the image data with the threshold value, and outputs binary bit image data expressing black when said image data value is greater than said threshold value, and outputs binary bit image data expressing white when said image data value is equal to or less than said threshold value.

FIGS. 9 and 10 show examples of a normal dithering matrix and a toner saving mode dithering matrix stored in dithering table memory 121. In the case of the normal dithering matrix of FIG. 9, the threshold values are set by adding units of 16, e.g., 8, 24, 40, 56, . . . 216, 232, 248, to each unit of 4×4 dots comprising a single pixel. In contrast, in the case of the toner saving mode dithering matrix of FIG. 10, values are set which are double the threshold values of the normal dithering matrix, e.g., 16, 48, 80. . . and the like. When the value of the doubled threshold values of the aforesaid normal dithering matrix exceed 255 (maximum value), a threshold value of 255 is used. When the threshold value is 255, comparator 120 outputs binary bit image data expressing white for all image data. The number of tones (density) of an image reproduced on paper is halved when the toner saving mode dithering matrix of FIG. 10 is used. Thus, when the toner saving mode is set, the amount of toner consumed is also halved when maintaining linear tonality on the low density side. The magnification of the threshold values assigned to the toner saving mode dither-inging matrix relative to the threshold values assigned when the toner saving mode is not set is not limited to a magnification factor of two, and may be determined by the image quality required for the toner saving mode. That is, the magnification factor may be set higher when it is important to reduce the amount of toner consumed, and said magnification factor may be set lower when a particular image quality is desired in the toner saving mode. In either case, the expression of linear tonality is maintained.

Another embodiment of the laser beam printer is described below.

Figure 11:
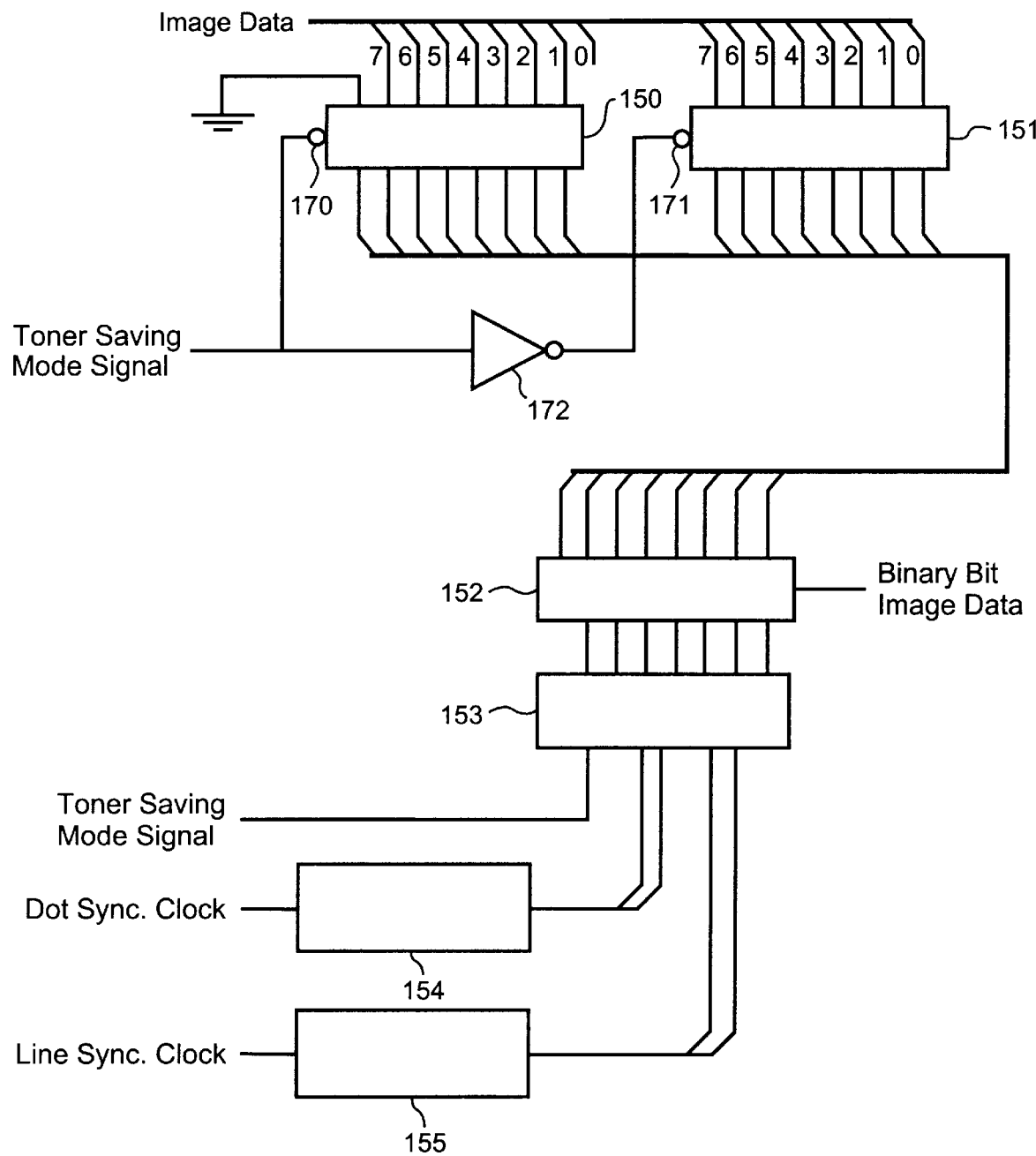
FIG. 11 shows another example of a circuit diagram of a halftone processing unit.

FIG. 11 shows a second embodiment of the circuit of tone processing unit 114 of FIG. 7. In this embodiment, binary bit image data are output using data comprising halved values of the image data as when the toner saving mode is set. Thus, the number of tones of an image formed on paper is reduced. Construction of the laser printer is identical to the previously described construction with the exception of the circuit of tone processing unit 114 shown in FIG. 11 and is, therefore, not repeated in the following discussion.

In tone processing unit 114, image data transmitted from image memory 113 are input to two data buffers 150 and 151. The image data expresses 1 dot in 8 bits. The 8-bit image data are input to data buffer 150 as data shifted 1 bit in the low order bit direction, i.e., the lower order 2-bits of data are input as lower order 1-bit data. Bit data having a [0] value are input at the high order 1-bit of data buffer 150. Thus, the values of data input to data buffer 150 are half the value of the image data. Data buffer 150 and 151 are provided with inverters 170 and 171 at their control pins, and stored image data are output to comparator 152 in accordance with the input of 1 signal. A toner saving mode signal inverted by inverter 170 is input to the control pin of data buffer 150. The toner saving mode signal is inverted by inverter 172, then inverted by inverter 171 and input to the control pin of data buffer 151. When the toner saving mode signal value is [1], i.e., when the toner saving mode is not set, the signal is input to data buffer 151. Data buffer 151 outputs the stored image data to comparator 152. When the toner saving mode signal value is [0], i.e., when the toner saving mode is set, the toner saving mode signal is input to data buffer 150. The data buffer 150 outputs the stored image data to comparator 152. Threshold values of a ditheringing matrix. e.g., the ditheringing matrix shown in FIG. 9, are stored in ditheringing table memory 153. The output from each 2-bit counter 154 of the main scan and 155 of the subscan are input to ditheringing table memory 153 as ditheringing matrix addresses. The ditheringing table memory 153 outputs the threshold value of the input address to comparator 152. Comparator 152 compares the image data input from one of the data buffers 150 and 151 with the data of the threshold values input from ditheringing table memory 153. In accordance with the comparison result, comparator 152 outputs binary image data expressing black when the image data exceed a threshold value, and outputs binary image data expressing white when the image data are equal to or less than a threshold value. The data from data buffer 150 input to comparator 152 when the toner saving mode is set have half the density overall as a result of the ditheringing process because said data have a value (density) ½ that of the image data. Thus, toner consumption can be reduced while maintaining expression of linear tonality.

Figure 13:
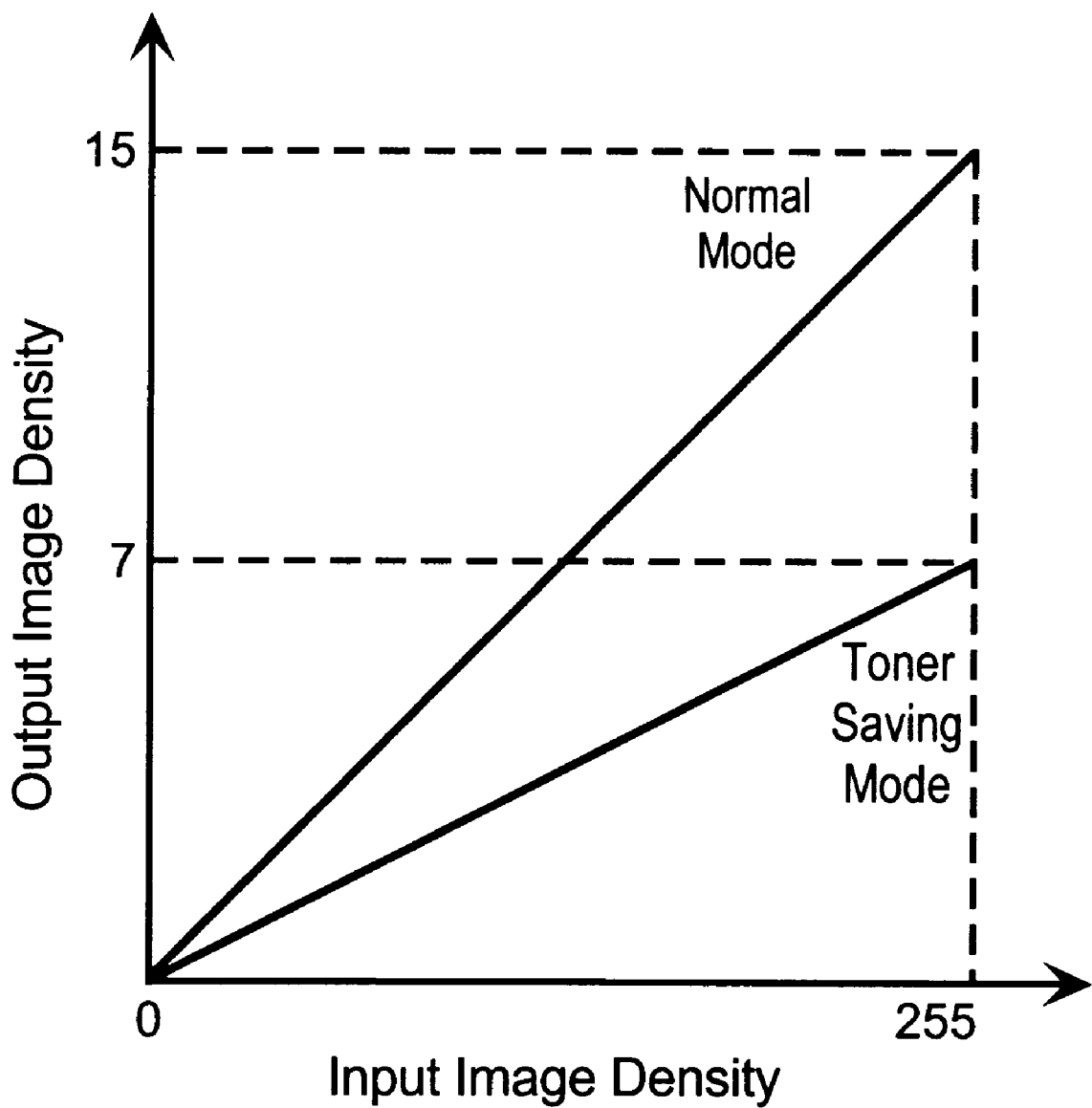
FIG. 13 is a graph showing the relationship between the print density (tones reproduced on paper) relative to the input density (8-bit image data values)

FIG. 12 shows ditheringing patterns used by the ditheringing table memory 153 when the toner saving mode is set. When the ditheringing patterns of FIG. 12 and the normal ditheringing patterns used when the toner saving mode is not set are compared, it can be understood that the number of ditheringing patterns used when the toner saving mode is set are fewer compared to the normal ditheringing patterns used when the toner saving mode is not set. This use of fewer ditheringing patterns when the toner saving mode is set is because the values of the image data output from data buffer 150 when the toner saving mode is set are ½ the values output when the toner saving mode is not set. FIG. 13 is a graph showing the relationship between the print density (tones reproduced on paper) relative to the input density (8-bit image data values); it can be understood from this graph that the expression of linear tonality is maintained even when the toner saving mode is set.

Although, in the present embodiment, the image data values input to the ditheringing table memory 153 when the toner saving mode is set are ½ the values input when the toner saving mode is not set, it is to be noted that the present invention is not limited to this arrangement inasmuch as said values may be determined in accordance with the image quality required when the toner saving mode is set. That is, the magnification factor may be set higher when it is important to reduce the amount of toner consumed, and said magnification factor may be set lower when a particular image quality is desired in the toner saving mode. In either case, the expression of linear tonality is maintained.

Figure 14:
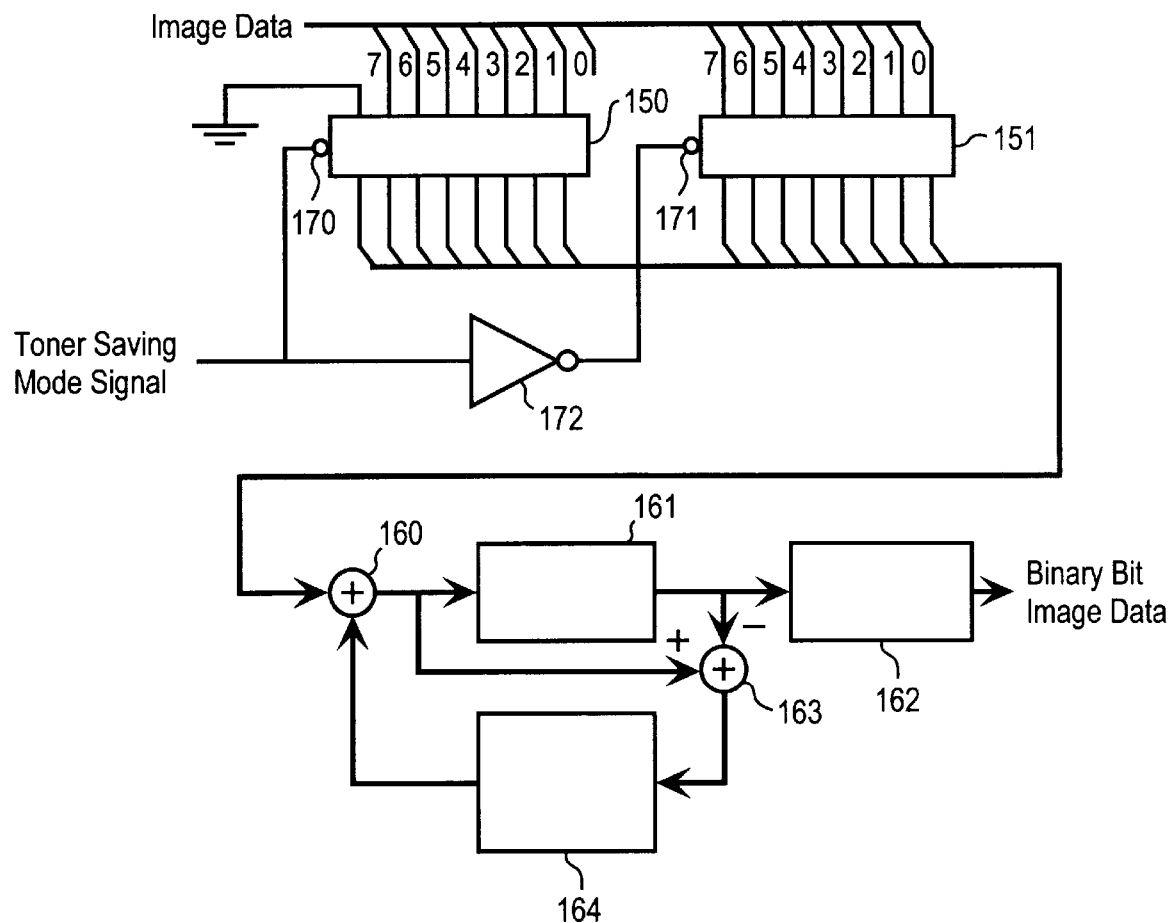
FIG. 14 shows another example of a circuit diagram of the halftone processing unit.

FIG. 14 shows a third embodiment of the circuit of tone processing unit 114 of FIG. 7. In this embodiment, components identical to components in previously described embodiments are designated by identical reference numbers, and are not discussed in detail. The present embodiment departs from the first and second embodiments in that an error diffusion method is used in accomplishing tone reproduction. That is, in the present embodiment, 8-bit image data output from data buffers 150 and 151 are input to comparator 161 via adder 160. The comparator 161 stores a threshold value, and compares the input image data with said threshold value. In the present embodiment, the threshold value is 127. When the image data exceed the threshold value, 8-bit image data [11111111] expressing black are output to binary circuit 162, whereas when the image data do not exceed the threshold value, 8-bit image data [00000000] expressing white are output to binary circuit 162. In binary circuit 162, the 8-bit image data expressing black are converted to bit data [1] expressing black, and the 8-bit image data expressing white are converted to bit data [0] expressing white, and output therefrom.

The image data output from comparator 161 are input to adder 163. Image data are also input to adder 163 otherwise than via comparator 161, and the difference between both data is output as error to error filter 164. Error filter 164 performs a process for dividing the pixels around said error.

Then the image data of the pixel input to adder 160 are added to error data for the pixel output from error filter 164, and input to comparator 161. The output of comparator 161 is input to binary circuit 162 and adding circuit 163 and subjected to processing identical to the aforesaid process.

In the present embodiment, normal tone processing and toner saving mode tone processing are selectable by selectably using data buffers 150 and 151 in accordance with the value of the toner saving mode signal. Thus, linear tonality expression is maintained when either data buffer 150 or 151 is used.

Figure 15:
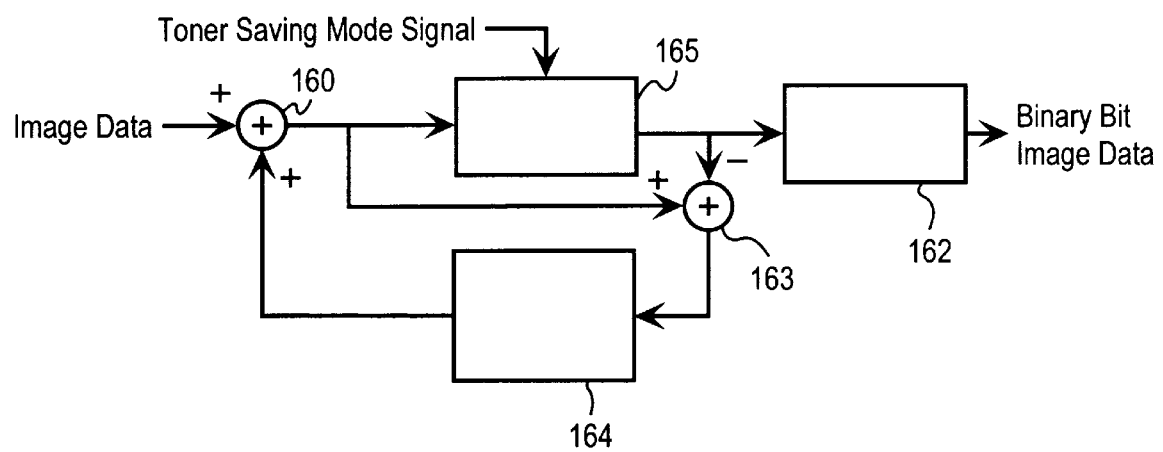
FIG. 15 shows still another example of a circuit diagram of a halftone processing unit.

FIG. 15 shows a fourth embodiment of a circuit of tone processing unit 114 of FIG. 7. In this embodiment, the threshold for normal tone processing and the threshold value for tone processing for saving toner are stored in comparator 165. Comparator 165 switches between these two threshold values via the input of the toner saving mode signals. In the present embodiment, the threshold value for the normal mode is 127, and the threshold value for the toner saving mode is 200. The tone processing via a error diffusion method of the present embodiment is identical to that of the third embodiment, and detailed description is thus omitted. In the present embodiment, the normal tone process and the toner saving tone process are selectable by switching the threshold value used by comparator 165. Linear tonality expression is maintained when either of said two threshold values is used.

Although the present invention has been described by way of examples pertaining to a laser beam printer, it is to be noted that other forms of image forming apparatuses are applicable insofar as said apparatuses form images by consuming a toning material, e.g., inkjet printers, thermal printers and the like. The previously described tone processing is particularly effective when applied to image forming apparatuses which reproduce halftone images via a variable area tone method.

When the present invention is used in an inkjet printer or thermal printer, the consumption of ink used as a toning material can be reduced in the toner saving mode (ink saving mode) is set while maintaining linear tonality expression. Furthermore, service life of the print heads can be extended because the number of times the inkjet head or thermal heat are driven can be reduced.

If a laser beam printer uses a reverse developing method, the number of laser emissions can be reduced when the toner saving mode is set, and the service life of the laser light source, e.g., a semiconductor laser, can be extended.

Although selection of the variable area tone process suing a ditheringing method, and image data and ditheringing matrix used when the toner saving mode is set is accomplished via hardware in the laser beam printers of the previously described embodiments, it is to be noted that such selection can be accomplished by execution of software processes via CPU 111.

In the aforesaid embodiments, the variable area tone process has been described by way of examples pertaining to ditheringing processes using simple ditheringing process and error diffusion. It is to be understood, however, that the present invention is not restricted to such arrangements and variable area tone processes using density pattern methods may be employed.

Although the setting of the toner saving mode is accomplished on the host computer side in the previously described embodiments, such setting may also be accomplished on the printer side. For example, a toner saving mode switch may be provided on the printer, such that the toner saving mode may be selectably set in response to the operation of said switch by user.

Furthermore, a means may be provided to detect a residual amount of toning material remaining in the printer, so as to automatically switch to the toner saving mode when said means detects that the toning material has been depleted. Specifically, in the case of a laser beam printer, a sensor may be provided to detect the amount of toner remaining in a developing device, such that the toner saving mode is executed when it is determined that the amount of remaining toner is less than a predetermined amount via the output of said sensor. The sensor for detecting remaining toner may be a weight sensor, photosensor or the like. When a developing device accommodates a two-component developing material, detection of the remaining toner may be accomplished by detecting the magnetic permeability of said developing material. More specific methods of detecting residual toner are well known and are, therefore, omitted from this description. In the cases of inkjet and thermal printers, a sensor may be provided to detect the amount of remaining ink in an ink tank. In constructions which automatically switch to a toner saving mode in accordance with the amount of remaining toning material as previously described, e.g., when the amount of remaining toning material is less than a predetermined amount, a user may still require high quality image output. Therefore, a desirable construction will allow a user to cancel a set toner saving mode. Specifically, a toner saving mode cancel switch may be provided, such that a set toner saving mode can be canceled in response to a user operating said switch. Furthermore, a construction may be used which allows cancellation of a set toner saving mode via command input from a host computer without providing a switch on the printer. In the aforesaid examples, the toner saving mode signal may be set at [1] in response to a cancellation command by a user.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image data processing device comprising: first processing means for processing input image data and for outputting the processed image data, said first processing means processing the input image data so that tone of the processed image data is substantially proportional to tone of the input image data;

second processing means for processing input image data and for outputting the processed image data, said second processing means processing the input image data so that tone of the processed image data is substantially proportional to tone of said input image data, wherein tone of the image data processed by said second processing means is different from tone of the image data processed by said first processing means; and selecting means for selecting one of said first processing means and said second processing means based on a toner saving mode signal.

2. The image data processing device as claimed in claim 1, wherein each of said first processing means and said second processing means has a look-up table for generating the processed image data based on the input image data, the look-up tables being different from each other.

3. The image data processing device as claimed in claim 2, wherein each of said look-up tables is a dithering matrix.

4. The image data processing device as claimed in claim 3, wherein said dithering matrix of said first processing means has threshold data higher than threshold data of said second processing means.

5. The image data processing device as claimed in claim 1, wherein said second processing means has a converter for reducing tone of the input image data.

6. The image data processing device as claimed in claim 1, wherein said toner saving mode signal is input from an external apparatus.

7. The image data processing device as claimed in claim 6, wherein the image data is input from said external apparatus.

8. An image forming apparatus for forming an image on a recording material by using toning material, said image forming apparatus comprising:

a processing circuit containing a first parameter and a second parameter, said processing circuit for converting input image data by using one of said first and second parameters; and a selector, for selecting said first parameter when a toner saving mode signal is absent, and for selecting said second parameter when the toner saving mode signal exists.

9. The image forming apparatus as claimed in claim 8, wherein said parameters are dithering matrices that are different from each other.

10. The image forming apparutus as claimed in claim 9, wherein said dithering matrix of said first parameter has threshold data lower than that of said second parameter.

11. The image forming apparatus as claimed in claim 8, wherein the toner saving mode signal is output to the selector when an amount of the toning material is less than a predetermined amount.

12. The image forming apparatus as claimed in claim 8, further comprising:

canceling means for canceling the toner saving mode signal.

13. An image forming apparatus for forming an image onto an recording medium by using toning material, said image forming apparatus comprising:

a processing circuit which converts tone of input image data represented by a plurality of bits into bit data representing black or white and outputs the bit data, said processing circuit including a first threshold data and a second threshold data, said processing circuit processing input image data using one of said first threshold data and said second threshold data; and a selector for selecting said first threshold data when a toner saving mode signal is absent, and for selecting said second threshold data when the toner saving mode signal exists.

14. The image forming apparatus as claimed in claim 13, wherein the toner saving mode signal is input from an external apparatus.

15. The image forming apparatus as claimed in claim 13, wherein the toner saving mode signal is input from a switch provided on said image forming apparatus.

16. The image forming apparatus as claimed in claim 13, wherein said first threshold data is lower than said second threshold data.

17. The image forming apparatus as claimed in claim 13, wherein the toner saving mode signal is output to the selector when an amount of the toning material is less than a predetermined amount.

18. The image forming apparatus as claimed in claim 13, further comprising:

canceling means for canceling the toner saving mode signal.

19. An image data processing device comprising:

a processing circuit which converts tone of input image data represented by a plurality of bits into bit data representing black or white and outputs the bit data, said processing circuit including a first threshold data and a second threshold data higher than said first threshold data, said processing circuit converting input image data using one of said first threshold data and said second threshold data; and a selector for selecting one of said threshold data in accordance with a toner saving mode signal.

20. The image data processing device as claimed in claim 19, wherein the toner saving mode signal is input from an external apparatus.

21. The image data porcessing device as claimed in claim 19, wherein the toner saving mode signal is input from a switch provided on said image forming apparatus.

22. An image data processing device comprising:

a converter which converts tone of input image data represented by a plurality of bits by shifting the input image data and outputs converted image data having a plurality of bits; and a comparator which compares the converted image data with a threshold data, and outputs bit data representing black or white in accordance with the comparison.

23. A method of generating data from input image data, said method comprising the steps of:

determining existence of a toner saving mode signal;

converting image data into a first data by using a first parameter when the toner saving mode signal is absent; and converting image data into a second data by using a second parameter when the toner saving mode signal exists, said second data being different from said first data.

24. The method as claimed in claim 23, wherein each of the first parameter and the second parameter are threshold data.

25. The method as claimed in claim 24, wherein said threshold data of said first parameter is lower than that of said second parameter.

26. An image forming apparatus for forming an image onto a recording medium by using toning material, said image forming apparatus comprising:

a detector which detects an amount of the toning material accommodate in the image forming apparatus; and a comparator utilizing a first parameter and a second parameter to process input image date;

a selector which selects the first parameter to save consumption of the toning material when the detected amount is less than a predetermined amount, and which selects the second parameter when the detected amount is not less than the predetermined amount.

27. The image forming apparatus as claimed in claim 26, further comprising:

canceling means for canceling the selection of said first parameter and selecting said second parameter even when the detected amount is less than a predetermined amount.

28. The image data processing device as claimed in claim 22, further comprising a selector for selecting said converter in accordance with a toner saving mode signal.

* * * * *